United States Patent [19]
Meshri et al.

[11] 3,929,918
[45] Dec. 30, 1975

[54] SYNTHESIS OF FLUOROGRAPHITE
[75] Inventors: Dayal T. Meshri; Wayne E. White; Charles L. Sowell, all of Sand Springs, Okla.
[73] Assignee: Ozark-Mahoning Company, Tulsa, Okla.
[22] Filed: Apr. 19, 1974
[21] Appl. No.: 462,258

Related U.S. Application Data
[63] Continuation-in-part of Ser. No. 295,675, Oct. 6, 1972, abandoned.

[52] U.S. Cl. ............................................. 260/653.9
[51] Int. Cl.² ......................................... C07C 17/00
[58] Field of Search ............. 260/653, 653.6, 653.8, 260/653.9

[56] References Cited
UNITED STATES PATENTS

| | | | |
|---|---|---|---|
| 2,709,183 | 5/1955 | Farlow et al. | 260/653.6 |
| 2,774,797 | 12/1956 | Mantell et al. | 260/653.9 |
| 2,993,567 | 7/1961 | Schachner | 260/653.9 |
| 3,674,432 | 7/1972 | Margrave | 423/439 |

*Primary Examiner*—D. Horwitz
*Attorney, Agent, or Firm*—Thomas M. Scofield

[57] ABSTRACT

Improved process and method of preparing carbon monofluorides; treating carbon of various forms with anhydrous hydrogen fluoride, removing free HF and impurities from the system with the inert gas, thereafter fluorinating the carbon with fluorine.

22 Claims, No Drawings

SYNTHESIS OF FLUOROGRAPHITE

This application is a continuation-in-part of application Ser. No. 295,675, filed Oct. 6, 1972, for "Synthesis of Fluorographite" now abandoned.

BACKGROUND OF INVENTION (REFERENCES)

The following prior art publications and patent references are made of record:
1. The Reaction Products of the Various Forms of Carbon with Fluorine. II. Carbon Monofluoride; Otto Ruff, Otto Bretschneider and Fritz Ebert. Z. anorg. allgem. Chem. 217, 1–19 (1934).
2. Structure of Carbon Monofluoride. Walter Rudorff and Gerda Rudorff. Z. anorg. Chem. 253, 281–96 (1947).
3. Polymers Obtained by Fluorination of Carbon. Wilber O. Tetters, Russell M. Mantell, and Herbert J. Passino (to M. W. Kellogg Co.). U.S. Pat. No. 2,786,874, Mar. 26, 1957.
4. Carbon Monofluoride as Lubricant. Institute Dr. Ing. Reinhard Straumann Akt.-Ges. (by Herbert Schachner). German Pat. No. 1,074,795, Feb. 4, 1960 (Cl.23c).
5. Studies on the Preparation of Fluorine and Its Compounds. VIII. The Formation Reaction of Graphite Fluoride. (1963) Nobuatsu Watanabe, Yoshiyuki Koyama and Shiro Yoshizawa, Denki-Kagaku (Japan) 31,756.
6. The Heat of Formation of Poly (Carbon Monofluoride). J. L. Wood, R. B. Badachhape, R. J. Lagow, and J. L. Margrave. Ref: J of Physical Chem. Vol. 73, No. 9, 3139, 1969.
7. Storage Battery Cell. Watanabe, Nobuatsu; Fukuda, Masataro (Matsushita Electric Industrial Co., Ltd.). Ger. Offen. 1,917,907 (Cl. H -Qlm), 18 Dec. 1969, Japan Appl. Apr. 12, 1968; 17 pp.
8. Kinetics of the Reactions of Elemental Fluorine. IV. Fluorination of Graphite. A. K. Kariakose and J. L. Margrave. Ref: J. of Physical Chem. 69, 2772 (1965).
9. Reaction of Fluorine and Carbon and Properties of Their Compounds. Nobuatsu Watanabe, Yoshiyuki Koyama, Atsuyoshi Shibuya and Kiyoshi Kumon. Memoirs of the Faculty of Engineering, Kyoto University Vol. XXXIII Part 1, Jan. 1971.
10. Dry Lubrication. Herbert Schachner, U.S. Pat. No. 2,993,567, issued July 25, 1961.
11. Superstoichiometric Carbon Monofluoride, etc. U.S. Pat. No. 3,674,432, Margrave, et al. issued July 4, 1972.

With respect to the structure and production of carbon fluorides, the above noted prior art recites the following: (1) CF is formed from Norite (Amorphous Carbon or carbon black) (free from O) and F at 280° and 28 mm pressure, or from grahite and F at 420° and 760 mm pressure. (2) Fluorination of graphite at 420° to 500° led to products of varying F content, up to a maximum corresponding to the compound $CF_{0.988}$. (3) Porous C, when fluorinated with a mixture of F and another halogen in a 10/1–20/1 ratio, preferably in the presence of a halide of a metal of groups I, II or VII as a catalyst, forms of inert polymer of the empirical formula $(CF_x)_n'$ where $x$ has a value of 1–2.5. (4) CF from the fluorination of graphite is used as a lubricant, especially for watches. (5) Reactions between graphite and fluorine in a temperature range of 300°–500° C. form white solid fluorides having the atomic ratio of C:F = 1:1. (6) Graphite powder and fluorine used in preparation of poly(carbon monofluoride), with helium employed to remove moisture and oxygen from the reaction zone as the furnace is heated up to 200°. Thereafter fluorine flow initiated and temperature to 600°. After several hours fluorine cut-off and helium passed thereover until furnace cooled to room temperature. (7) Storage battery employing a positive electrode consisting of a solid C fluoride $(CF_x)_n$ ($x$ = 0.5–1). Latter obtained by fluorination of synthetic graphite, amorphous graphite or graphitized soot by heating in a fluorine containing atmosphere at 250°–450°. (8) In this publication, as a continuation of kinetic studies of elemental fluorine reactions, graphite fluorination rate was measured under various conditions of temperature and fluorine pressure. (9) Reactions of fluorine and six kinds of carbon materials including graphite fiber, petroleum cokes, wood charcoal, binder carbon, carbon black and natural graphite. Fluorine gas introduced into a heated reactor containing the carbon sample. The diluting gas of fluorine being nitrogen or argon. Fluorinated graphite having a carbon to fluorine ratio of about 1:1 may be used as a lubricant. (11) Methods of producing carbon monofluorides having fluorine to carbon ratios from about 1/1 to about 1.12/1 from carbon and fluorine and carbon monofluoride having a superstoichiometric fluorine to carbon ratio of approximately 1.12/1 having a combustion temperature in one atmosphere of oxygen of 726°C.

OBJECTS OF THE INVENTION

An object of the invention is to provide a process of preparing carbon fluoride wherein any high purity graphite, carbon black or other forms of carbon can be fluorinated.

Another object of the invention is to provide such a process wherein any one of helium, argon or cheap commercially available nitrogen may be used as diluent or flashing gas in the process.

Another object of the invention is to provide such a process wherein the reaction vessel may be of any desired configuration.

Another object of the invention is to provide such an improved process wherein the graphite, carbon black or other forms of carbon are first treated with anhydrous hydrogen fluoride at a critical temperature level, the temperature zone for giving best activation having been determined.

Another object of the invention is to provide a process as described wherein carbon particles and objects of a wide range may be fluorinated.

Another object of the invention is to provide a process wherein explosion hazards are minimized, indeed substantially eliminated.

Another object of the invention is to provide such a process wherein, after the carbon is treated with anhydrous HF, free HF is removed from the system by an inert gas such as argon, helium or nitrogen whereby to eliminate explosions caused by the presence of free HF in the system. Further, in order to remove or burn impurities which may be present in the carbon, etc. which also might aid or cause explosions, effective flushing of the reactor with an inert gas after each fluorine treatment is effected.

Another object of the invention is to provide such a process as described wherein fluorination after hydrogen fluoride treatment and flushing is performed in an optimum and temperature-controlled manner whereby to also further eliminate explosions and provide, further, a high yield of the desired ultimate product material.

Yet another object of the invention is to avoid furnishing excess of energy late in the fluorination process which might break C—F, C—C bonds. (Whereby to provide just enough energy to break F—F bond and C—C bonds whereby the latter may form C—F bonds and stabilize the system.)

Another object of the invention is to provide a dependable, relatively inexpensive, high yield, predictable, relatively safe process of producing carbon fluorides from various forms of carbon, anhydrous hydrogen fluoride, fluorine and inert gas diluents, whereby to dependably produce, in high yield, carbon fluoride in the carbon-fluorine ratios of $C_1F_{0.40}$ to $C_1F_{1.26}$, the optimum carbon-fluorine range.

Another object of the invention is to provide a plurality of methods of employing anhydrous hydrogen fluoride in either liquid or gaseous form whereby to prepare graphite or other carbon sources for fluorination thereof to carbon fluorides or fluorographite ($C_1F_1$).

Another object of the invention is to provide an improved process of producing carbon fluorides or fluorographite wherein the carbon source is pretreated with liquid or gaseous anhydrous hydrogen fluoride; thereafter same is flushed with an inert gas; therefore the pretreated carbon source is fluorinated for an extended period whereby to produce high yields of carbon fluorides with minimum quantities of either carbon or $C_4F$ remaining present therewithin.

Another object of the invention is to provide an added improvement to the immediately above described process of fluorinating graphite or other carbon source wherein, before the prolonged fluorination, an additional brief fluorination is provided at a fast gas flow rate sandwiched between the HF gas flushing and the beginning of the long term fluorination.

Other objects of the instant invention are to provide the described improved process of fluorinating graphite or other carbon source to graphite fluoride or carbon fluorides wherein a controlled, narrow, temperature range of hydrogen fluoride pretreatment of the graphite is specified; the graphite or carbon source may be optionally treated with liquid or gaseous anhydrous hydrogen fluoride in the pretreatment step; a two-stage fluorination is optionally provided whereby to minimize the possibility of explosions; the preferred temperature range for optimum long range fluorination is clearly defined; and, finally, it is possible to produce predominantly $C_1F_1$ by fluorination in the final stage in a temperature range of 300° to 500° C., while the optimum product $C_1F_{1.26}$ may be produced by fluorinating in the final stage in the temperature range of 500° to 600° C if the starting material is graphite.

Yet a further object of the invention is to provide clearly defined, improved, novel and dependable processes of producing high yields of $C_1F_1$ and $C_1F_{1.26}$ as desired, by careful control of the process stages and temperatures and conditions thereof.

Other and further objects of the instant invention will appear in the course of the following description thereof.

PROBLEMS IN FORMATION OF CARBON FLUORIDES

Prior to the improvements constituting the instant invention, the following summary of information was typical of advanced known procedures for producing carbon fluorides or graphitic fluoride and typically embodied several of the various problems, limitations or difficulties noted.

The prior art processes of making $C_1F_x$ are recited in Rudorff, et al., and Watanabe, et al., supra, the patents to Schachner also noted above reciting the Rudorff process.

The Rudorff process comprises the steps of:
1. Putting the graphite or carbon source in the reactor;
2. Heating to 150° C.;
3. Dry or flush with helium;
4. Raise the temperature of the reactor to 500° C.;
5. Pass helium and/or argon-diluted fluorine slowly into the reactor and thereafter quickly;
6. Stop the fluorination and cool reactor and remove the product.

The process of Watanabe, employing a furnace, may be briefly described as follows:
1. The graphite or other carbon source is inserted in the vacuum furnace;
2. The furnace is heated and a vacuum drawn thereon to approximately 200° C. or thereover;
3. Further heat is added;
4. Diluted, successive charges of fluorine are passed into the reactor;
5. After each fluorine insert or charge, the pressure is permitted to drop, whereafter more diluted fluorine is added in successive charges (several times);
6. Thereafter the furnace and reactor is permitted to cool and excess fluorine is pumped out.

There are many drawbacks to these prior art, known processes. Thus, carbon sources which could be fluorinated are limited with respect to purity and fineness. The critical reaction factors were not determined or controlled. A high probability of an explosion resulting in each reaction or run was present. Product yield and quality varied substantially from run to run. It was not known to prepare the graphite source for fluorination by utilization of anhydrous hydrogen fluoride. In short, the prior art did not and does not know a dependable, relatively inexpensive, high yield, or predictable, safe process of producing carbon monofluoride from a carbon source. Still further, not only was it not possible to produce large or high yields of $C_1F_1$ without excess quantities of graphite or other forms of carbon and $C_4F$ (tetracarbon fluoride) remaining present, it was not further possible to dependably produce the more desirable white product of $C_1F_{1.26}$. Yields of the prior art are poor.

THE INVENTIVE PROCEDURE

Carbon monofluorides can be produced from elemental fluorine and graphite, or those forms of carbon having some graphitic structural characteristics, such as graphitic carbon black. Graphite, as the term is normally used, is a crystalline allotropic from of carbon in which the carbon atoms are arranged in sheets of regular hexagons. The distance between two consecutive layers is sufficiently large to preclude covalent bonds between them. The layers are thus held together by comparatively weak van der Waals forces and the overall structure is that of a two-dimensional giant molecule within each layer. Due to a lack of strong bonding between the layers, these layers slide over each other and give a greasy feel and lubricating character to graphite.

In this allotropic form of carbon, each carbon atom shares its four electrons with three other carbon atoms and resonance imparts about a third double bond character to each carbon to carbon link, as a result the C—C bond distance is slightly higher, 1.42A than C—C bond distance in benzene, which is 1.39A.

Since practically all forms of carbon have some graphitic structural characteristics, and thus can be used in accordance with this invention, the term carbon will be used to describe the general class of materials that can be reacted with fluorine to form carbon monofluorides. However, the most efficient conversion of carbon and fluorine to carbon monofluorides occurs when graphite or those forms of carbon exhibiting strong graphitic structural characteristics are reacted with fluorine.

The steps of the improved process and method of producing carbon monofluorides will first be described:

1. The carbon is placed in a reactor preheated to 300° to 400° C. (There are advantages to place the carbon in a preheated reactor if it is intended to use the same reactor for a continuous batch process in that (a) time is saved as one need not wait to use reactor until it comes to ambient; (b) energy is lost in cooling and reheating reactor. Other than the foregoing, the process may start with reactor at ambient.)
2. Anhydrous hydrogen fluoride gas is thereafter passed over the carbon bed with the temperature of the reactor and its contents maintained between 210° to 350° C. HF treatment continues between 2 to 3 hours. (1½ to 2½ lb./hr.)
3. The reactor is flushed with dry nitrogen until the exiting gases are free of HF.
4. Fluorine is passed into the reactor with the reactor temperature rising to 300° to 500° C. due to exothermic heat of reaction. This first fluorine treatment is continued 15 to 30 minutes.
5. Thereafter the reactor is flushed with dry nitrogen, somewhat lowering the reactor temperature until same is free of smoke, AHF and fluorine.
6. Thereafter combined fluorine and nitrogen flow is continued for 12 to 16 hours if a highly fluorinated carbon such as $C_1F_1$ to $D_1F_{1.26}$ is desired. The temperature range for this step is 300°–600° C.
7. Thereafter fluorine flow is stopped but nitrogen flow maintained and the reactor cooled to about 300° C.
8. The reaction products are thereafter unloaded.
9. Typical reaction time is 12 to 16 hours.

REACTION FEATURES OR CONDITIONS

The following features of the improved reaction are noted:

1. Several forms of high purity carbon from submicron to 20 mesh have been fluorinated by this process. Further, the process has been developed to such a stage that any high purity graphite, carbon black or other forms of carbon can be fluorinated.
2. Either helium, argon or cheap commerically available nitrogen may be used as a diluent gas.
3. The reactor may be cylindrical, rectangular or square. (or any other desired shape)
4. The most effective temperature zone for HF treatment (that which gives best activation) is 250°–310° C.
5. After activation, it is necessary to remove free HF from the system. Any presence of free HF in the system will cause explosion during fluorination at high temperature. It is also believed there are some impurities in carbon which cause explosion. To remove free HF from the system and to burn the impurities, an additional step is added.
6. The latter is a step wherein the reactor is flushed with nitrogen after HF treatment until no HF fumes can be detected. Thereafter fluorine (purified by passing same through a NaF trap to remove HF therefrom) is passed at a relatively high flow rate whereby, immediately, white smoke due to HF and other volatile compounds appear. During this stem, fairly large amounts of HF are removed from the system. This has markedly helped to reduce the rate of explosions.
7. Specifically with respect to the latter step, after AHF treatment and during flushing the reactor with $N_2$ gas, the temperature of the reactor is raised to 300°–500° C. Fluorine is passed at the rate of 20 to 40 liters per hour, for 15 to 30 minutes. Thereafter, the reactor is flushed with $N_2$, until the reactor was free from smoke, HF and fluorine.
8. Turning to the fluorine step, thereafter, the fluorine flow is maintained at the rate of 1 to 25 liters per hour, depending upon the charge of carbon and the degree of fluorination desired. Nitrogen flow is simultaneously maintained between 2 and 40 liters per hour, preferably 6 to 10 liters per hour. The typical reaction time for $C_1F_1$ or above $C_1F_1$ is 12 to 16 hours.
9. With respect to the described prior art processes, once fluorination was started, little significance was paid to the fact or cause of temperature decrease. Commonly, with reactor temperature variation due to various factors during fluorination, with or without attempted compensation by heat addition to the reactor, after an hour or so, explosions would be common.
10. In the instant process, the heat of the reactor is monitored and controlled as follows. The typical reaction temperature runs between 300° to 600° C. During the first 6 to 8 hours of fluorination, the reaction temperature is maintained between 510° to 550° C. and then temperature is lowered and maintained at 450° or below for another 6 to 8 hours. The best range is 300° to 500° C. as the chances for explosion may increase above thereabove.
11. During the early stage of reaction, high temperature increases the rate of the reaction, and there is a lot of material to utilize this heat and form carbon fluoride. After a certain period of fluorination, the system is changed. Excess of energy available can break C—F as well as C—C bonds, which will envolve much more energy than the system can utilize, resulting in explosion. The early fluorination (first 6 to 8 hours) of high temperature provides just enough energy to break the F—F bond and a few C—C bonds. The lowering of the temperature of the reactor to 450° or below for the next 6 to 8 hours forms C—F bonds and stabilizes the system. The typical reaction runs between 300° to 550° C.

12. At the end of the reaction, there is a decrease in the heat of reaction, and a temperature of the reactor drops at lease 10° to 20°. Fluorine flow is cut off and the reactor is cooled to 300°, flushed with nitrogen and the reactor is unloaded.
13. The yield typically is 55 to 90% on the basis of $(C_1F_x)_n$ where $x$ is equal to or greater than 1 and $n$ is unknown. There is always a substantial gain in weight. The color of the product is white, cream colored or slightly off-color. Typical range is $C_1F_{0.90}$ to $C_1F_{1.18}$. The typical $C_1F_1$, which may be increased $C_1F_{1.26}$ by increasing the reaction time and running at slightly higher temperature.

SPECIFIC EXAMPLE NO. 1

In a typical run, CS-5-142, in the instant procedure for making carbon fluoride from sub-micron graphite, 200 grams of graphite from Asbury Graphite were loaded in a nickel boat. The boat was placed in a reactor which was preheated to 350° C. Anhydrous hydrogen fluoride gas was thereafter passed over the graphite bed, which lowered the temperature of the reactor to 200° C. Heat was provided in such a manner that the temperature of the reactor and its contents remained at 260° C. HF treatment was stopped after 3 hours.

Thereafter, the reactor was flushed with dry nitrogen for 3 hours. During this flushing process, the temperature of the reactor was raised to 390° C.

Thereafter, fluorine was started at the rate of 40 liters per hour. As a reaction between graphite and fluorine is exothermic, the temperature of the reactor increased to 420° C. During this fluorine treatment, white smoke was observed due to evolution of AHF and some formation of $CF_4$. This treatment also burned out the impurities present in the graphite. This first fluorine treatment was carried on for 30 minutes.

Thereafter, the reactor was again flushed with dry nitrogen, until it was free from smoke, AHF and fluorine. This nitrogen flush lowered the reactor temperature by 20° C.

Thereafter, fluorine flow was reinstituted and maintained at a rate of 15 liters per hour and nitrogen flow (continuous therewith) at the rate of 10 liters per hour. The fluorine was diluted with nitrogen inside the reactor. The combined fluorine and nitrogen flow (flows) was continued for a period of 16 hours at 480° C. A drop of 20° C in the temperature was observed at the end of the above period.

At the latter stage, fluorine flow was stopped, but the flow of nitrogen was maintained. Heating elements of the reactor were turned off to cool same. When the reactor was cooled to 350° C, the product was unloaded. Total weight of the fluorinated produce was 469 grams and net gain of 269 grams. The material was white.

SPECIFIC EXAMPLE NO. 2

In a typical run, DTM-2-120, for the instant procedure for making carbon fluoride from heterogenous particles varying in size from 5 microns to 10 mesh, (specifically carbon black obtained from Ashland Chemical Company as 3024P) 200 grams of the carbon black as loaded in a nickel boat. The boat was placed in a reactor which was at room temperature approximately 22° C. The reactor was heated to 300° C, and AHF gas was thereafter passed over the carbon black which lowered the temperature of the reactor to 270° C. The heat was provided in such a manner that the temperature of the reactor and its contents remained at 270° C during HF treatment.

HF treatment was stopped after 3 hours. Thereafter the reactor was flushed with dry nitrogen for 3 hours. During this flushing process, the temperature was raised to 280° C and thereafter fluorine was started at the rate of approximately 15 liters per hour. This raised the temperature to 300° C. Nitrogen flow was at the rate of 10 liters per hour.

The fluorination was carried on at 320° C. The fluorine was diluted with nitrogen inside the reactor. The combined fluorine and nitrogen flow (or flows) was continued for a time period of 16 hours. At the end of this period, fluorine flow was stopped but the nitrogen flow was maintained. Heating elements of the reactor were turned off to cool same. When the reactor was cooled to 200° C, the products were withdrawn. It appeared that the conversion of carbon black to $C_1F_1$ was about 70%. Therefore the products were reloaded in the reactor and above procedure was repeated. On second fluorination, the conversion of carbon black was complete and the products were unloaded. The fluorinated product has a variety of particle sizes from sub-micron to 30 mesh. The particles were crushed and uniform sample was analyzed as $C_1F_{1.12}$. Total weight of the product was 210 grams.

ALTERNATE PRETREATMENT WITH HF

As an optional pretreatment means and process, the following is here disclosed:
1. The quantity of finely divided graphite or other carbon source to be fluorinated to $C_1F_1$ is placed into a liquid tight container;
2. A molar excess of liquid anhydrous hydrogen fluoride is added to the container;
3. The carbon source or finely divided graphite and liquid anhydrous hydrogen fluoride are thoroughly mixed by shaking same vigorously, thereafter leaving the hydrogen fluoride saturated graphite in the container to soak, preferably for at least 1 to 2 hours; (other mixing means may be employed.)
4. Thereafter the excess liquid HF is poured off from the hydrogen fluoride damp graphite or carbon source;
5. The HF damp carbon is placed into the reactor of the type previously described with respect to the basic process;
6. The reactor is heated to 200° to 350° C., preferably 250°–310° C.;
7. After approximately 2 hours, the reactor is flushed with an inert gas, for example, nitrogen, argon or helium, for 1 to 2.5 hours. During this flushing process, the temperature of the reactor is raised to 400°–450° C.

Thereafter, fluorination may be accomplished as previously described. That is, there may be a first, high gas flow rate fluorination to remove anhydrous HF and impurities. Alternatively, the direct final fluorination may be begun. The process, at any rate, is carried out as previously or hereinafter described.

OMISSION OF PREFERRED FIRST FLUORINATION

It should be noted that, if a higher explosion hazard is not considered objectionable, the first stage fluorination, where fluorine is typically passed at the rate of 20 to 40 liters per hour, for 10 to 30 minutes at 400° to 450° C. (quantity of carbon is 150 to 210 grams, typically), may be omitted. In this case, it is assumed that the presence of free HF in the system and/or the presence of some impurities in the carbon may cause explosions. To some extent, this hazard may be mimimized by drawing a vacuum on the reactor after the HF treatment as previously described. However, this is not in any base as effective as the first stage fluorination previously described.

MISCELLANEOUS REMARKS $C_1F_1$ made from graphite is presumed to be a polymer which has been changed in structure from plane layers of graphite to presumed puckered layers thereof while having maintained $SP^3$ hybridization. It is assumed that the mechanism of anhydrous hydrogen fluoride treatment with respect to the carbon source (graphite) may involve the formation of an intra-planar complex where the carbon-carbon bonds are expanded or weakened. This latter bond relationship is presumed maintained when the HF has been flushed from the system.

$C_4F$ decomposes at 150° C. to $CF_4$ plus carbon. It does the same slowly at room temperature. Thus, it has a short shelf life. With moisture, it produces HF.

Applicants are the first to pretreat carbon (graphite) with hydrogen fluoride before fluorination thereof, same thereafter removed from the system, thereby to obtain an high yield of $C_1F_1$ without explosions.

In addition to the pretreatment with gaseous or liquid hydrogen fluoride, the treatment temperature with hydrogen fluoride is controlled to a narrow temperature range. Yet further, a two-stage fluorination is optionally provided. A clearly defined optimum fluorination temperature range of both stages of fluorination has been defined. Finally, by fluorinating graphite in the final fluorination stage in the range of 450° to 500° C., $C_1F_1$ may be produced in high yield amounts. By fluorinating graphite in the final stage in the temperature range of 550° to 600° C., a very high yield of the white product $C_1F_{1.26}$ may be produced. In the instant process, $C_1F_1$ and $C_1F_{1.26}$ may be produced in any amounts, typically, from 5 to 500 grams, as desired.

The process basically consists of first treating carbon with AHF, then treating the carbon with an inert gas and finally reacting the AHF free carbon with fluorine. The main process variation involves the use of liquid AHF, mixing and soaking with same, instead of first treatment with gaseous AHF.

Also included within the definition of the term carbon are all physical forms of carbon, including particulate carbon, carbon fibers and filaments, and various shapes of solid carbon, such as rods, spheres, plates, gaskets and hollow cylinders.

TYPICAL SYNTHESIS OF $C_1F_{1.26}$ FROM GRAPHITE

1. The reactor is loaded with 200 grams of graphite at 25° to 350° C.
2. The hydrogen fluoride treatment is started and the temperature of the reactor is maintained between 260°–310°C. This HF treatment is carried out for 2 to 3 hours.
3. The reactor is flushed with inert gas (preferably nitrogen) at 310°–450° C until it is free from HF.
4. Fast flow of fluorine diluted with nitrogen is started at 450° to 500° C for 15 minutes.
5. The reactor is flushed with dry nitrogen until same is free from HF and smoke.
6. Thereafter, fluorine diluted with nitrogen is again passed at 550° to 600° C for 16 hours to obtain $C_1F_{1.26}$.

TYPICAL SYNTHESIS OF $C_1F_{1.26}$ FROM CARBON BLACK

1. The reactor is loaded with 200 grams of graphite at 25° to 300° C.
2. HF treatment is started and temperature of the reactor is maintained between 260°–310° C. This HF treatment is carried out for from 2 to 3 hours.
3. The reactor is flushed with nitrogen at 300° C until it is free from HF.
4. Fluorine diluted with nitrogen is started at 300° C. This treatment by fluorine diluted with nitrogen is continued at 290° to 300° C for approximately 16 hours. The product is partially present at the end of this stage.
5. The product is again activated with HF, specifically, that is, HF treatment is restarted and the temperature of the reactor is maintained between 260°–310° C from 2 to 3 hours.
6. The reactor is flushed with nitrogen at 300° C until it is free from HF.
7. Fluorine diluted with nitrogen is passed for another 14 to 16 hours and the white $C_1F_{1.26}$ product is obtained. (However, if the product has some grey material therein, it is further reacted with fluorine diluted with nitrogen until it is all snow-white, that is, $C_1F_{1.26}$.)

PHYSICAL PROPERTIES OF $C_1F_{1.26}$ FROM GRAPHITE

1. Snow-white powder.
2. In the atmosphere of nitrogen it is (a) stable up to 650° C. (b) there is slight decomposition at 662° C and (c) there is complete decomposition at 737° C.
3. Good lubricating properties are present.
4. Turbostratic structure.
5. Interlayer spacing 6.03A.

PHYSICAL PROPERTIES OF $C_1F_{1.26}$ FROM CARBON BLACK

1. Snow-white powder.
2. Stability is around 400° C. Decomposition starts around 340° C.
3. Better lubricating properties and better dispersion in mineral oil.
4. Structure — Amorphous
5. Interlayer spacing 6.7A.

COMPARATIVE X-RAY DIFFRACTION DATA

Data was obtained from samples of $C_1F_{1.26}$ made from carbon black and graphite, respectively, by the methods of typical synthesis above recited. Each sample had three lines.

| Material From Carbon Black At 300°C | Material From Graphite At 550° C |
|---|---|
| d | d |
| 6.7A | 6.03A |
| 2.35A | 2.41A |
| 2.227A | 2.23A |

From the foregoing, it will be seen that this invention is one well adapted to attain all of the ends and objects hereinabove set forth together with other advantages which are obvious and which are inherent to the process.

It will be understood that certain process features, steps and sub-combinations thereof are of utility and may be employed without reference to other features, steps and process subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

Having thus described our invention, we claim:

1. A process of preparing carbon fluorides comprising the steps of:
   first treating relatively substantially pure carbon with substantially anhydrous hydrogen fluoride at a temperature in the range of 200°–350° C. for a period of 2 to 3 hours,
   then flushing the said hydrogen fluoride-treated carbon with an inert gas comprising one of the class of nitrogen, argon or helium in the temperature range of 300°–450° C. until the exiting gases are substantially free of HF,
   and thereafter reacting the substantially hydrogen fluoride-free carbon with fluorine at a temperature in the range of 300°–600° C. for a time period of 12 to 16 hours.

2. A process as in claim 1 wherein the carbon is in the form of graphite.

3. A process as in claim 1 wherein the carbon is one of the non-crystalline forms.

4. A process as in claim 1 wherein the carbon is of 95% or higher percent purity, preferably over 95%.

5. A process as in claim 1 wherein the first anhydrous HF treatment is in the temperature range of 250°–310° C.

6. A process as in claim 1 wherein the carbon is first placed in a reactor preheated in the temperature range of approximately 300°–400° C,. anhydrous HF gas thereafter being passed over the carbon with the temperature of the reactor and its contents maintained in the range of 200°–350° C.

7. A process as in claim 1 including the additional step of a first, relatively short time fluorine treatment of the inert gas flushed hydrogen fluoride treated carbon wherein the said first fluorine treatment is continued for only 15 to 30 minutes with the reactor temperature rising to 300°–500° C, the reactor then being flushed with dry inert gas immediately after said first short term fluorine treatment, thereby somewhat lowering the reactor temperature, until same is free of smoke, anhydrous HF and fluorine.

8. A process as in claim 1 wherein the substantially hydrogen fluoride free carbon is treated with a combined fluorine and inert gas flow until an excess of fluorine over the theoretical amount is used.

9. A process as in claim 1 wherein a snow-white product essentially $C_1F_{1.26}$ is produced by reacting the substantially hydrogen fluoride free graphite with fluorine in the temperature range of 550° to 600° C.

10. A process as in claim 1 wherein a snow white product essentially $C_1F_{1.18}$ to $C_1F_{1.26}$ is produced by reacting the substantially hydrogen fluoride free non-crystalline carbon such as carbon black with fluorine in the temperature range of 300° to 400° C.

11. A process as in claim 1 wherein a vacuum is drawn on the reactor after treating the hydrogen fluoride treated graphite with an inert gas and before reacting same with fluorine.

12. A process as in claim 1 wherein the first 6 to 8 hours of fluorination are carried out at a reaction temperature between 510° to 550° C., the temperature thereafter lowered and maintained at 450° C. or below.

13. A process as in claim 1 wherein the first 6 to 8 hours of fluorination are carried out at a reaction temperature between 510° to 550° C., the temperature thereafter raised into the range of 550° to 600° C.

14. A process of preparing carbon fluorides comprising the steps of:
   placing a quantity of finely divided carbon in a liquid tight container;
   adding a molar excess of liquid anhydrous hydrogen fluoride to said carbon to said container;
   thoroughly mixing together the liquid anhydrous HF and finely divided carbon in the container and permitting the HF and carbon to soak together for at least substantially an hour;
   pouring off the excess HF from the HF damp carbon;
   heating the HF damp carbon in a reaction vessel at a temperature in the range of 200° to 350° C. for a period of 2 to 3 hours;
   then flushing the said HF-treated carbon with an inert gas comprising one of the class of nitrogen, argon or helium in the temperature range of 300°–450° C. until the exiting gases are substantially free of HF;
   and thereafter reacting the substantially hydrogen fluoride-free carbon with fluorine at a temperature in the range of 300°–600° C for a time period of 12 to 16 hours.

15. A process of preparing carbon fluoride of the composition $C_1F_{1.26}$ from graphite comprising the steps of first treating substantially pure graphite with substantially anhydrous hydrogen fluoride at a temperature in the range of 260°–310° C for a period of 2 to 3 hours;
   then flushing the said hydrogen fluoride-treated graphite with an inert gas in the temperature range of 310°—450° C until same is free of HF;
   thereafter reacting the substantially hydrogen fluoride-free graphite with fluorine at a temperature in the range of 450° to 500° C for approximately 15 minutes;
   thereafter flushing the fluorine-treated graphite with an inert gas until the same is free from HF; and
   thereafter reacting the graphite with fluorine at a temperature in the range of 550°–600° C for a time period of 12 to 16 hours in order to obtain $C_1F_{1.26}$.

16. A process as in claim 15 wherein the second fluorine treatment takes place in the range of 16 hours until the product is substantially snow-white.

17. A process of preparing carbon fluoride of the composition $C_1F_{1.26}$ from carbon black comprising the steps of:
   first treating substantially pure carbon black with substantially anhydrous hydrogen fluoride at a temperature in the range of 260°–310° C for a period of 2 to 3 hours;
   thereafter flushing the said HF-treated carbon black with an inert gas at approximately 300° C until same is free from HF;
   thereafter reacting the substantially HF free carbon black with fluorine at a temperature in the range of 290°–300° C for a time period of 12 to 16 hours;

thereafter again treating the now fluorine-treated carbon black with hydrogen fluoride in the temperature range of 260°–310° C for a period of 2 to 3 hours;

thereafter treating the twice HF-treated carbon black with an inert gas at a temperature of approximately 300° C until same is substantially free of HF; and thereafter reacting the substantially HF-free carbon black with fluorine at approximately 300° C for a time period of 12 to 16 hours to produce $C_1F_{1.26}$.

18. A process as in claim 17 wherein the second fluorine treatment is carried out for approximately 14 to 16 hours until the product is substantially snow-white.

19. Carbon fluoride of the composition $C_1F_{1.26}$ prepared from graphite comprising a snow white powder which, in an atmosphere of nitrogen is stable up to 650° C, showing slight decomposition at 662° C and complete decomposition at 737° C, same of turbostratic structure and having an inter-layer spacing of 6.03A.

20. The carbon fluoride of structure $C_1F_{1.26}$ prepared from carbon black which is a snow white powder having a stability in an atmosphere of nitrogen of around 400° C with decomposition starting around 340° C, same of amorphous structure and having an inter-layer spacing of 6.7A.

21. Carbon fluoride as in claim 19 which is prepared by the steps of:
   first treating substantially pure graphite with substantially pure anhydrous hydrogen fluoride at a temperature in the range of 260°–310° C. for a period of 2 to 3 hours;

then flushing the said hydrogen fluoride-treated graphite with an inert gas in the temperature range of 310°–450° C. until same is free from HF;

thereafter reacting the substantially hydrogen fluoride free graphite with fluorine at a temperature in the range of 450°–500° C. for approximately 15 minutes;

thereafter flushing the fluorine-treated graphite with an inert gas until same is free from HF; and thereafter reacting the graphite fluorine at a temperature in the range of 550°–600° C. for a time period of 12 to 16 hours in order to obtain $C_1F_{1.26}$.

22. Carbon fluoride as in claim 20 prepared by a process comprising the steps of:
   first treating substantially pure carbon black with substantially anhydrous hydrogen fluoride at a temperature in the range of 260°–310° C. for a period of 2 to 3 hours;

thereafter flushing the said HF-treated carbon black with an inert gas at approximately 300° C. until same is free from HF;

thereafter reacting the substantially HF free carbon black with fluorine at a temperature in the range of 290°–300° C. for a time period of 12 to 16 hours;

thereafter again treating the now fluorine-treated carbon black with hydrogen fluoride in the temperature range of 260°–310° C. for a period of 2 to 3 hours;

thereafter treating the twice HF-treated carbon black with an inert gas at a temperature of approximately 300° C until same is substantially free of HF; and reacting the substantially HF-free carbon black with fluorine at approximately 300° C. for a time period of 12 to 16 hours to produce $C_1F_{1.26}$.

* * * * *